(12) United States Patent
Roeckner et al.

(10) Patent No.: US 12,005,973 B2
(45) Date of Patent: Jun. 11, 2024

(54) STEERING SYSTEM AND METHOD FOR OPERATING A STEERING SYSTEM

(71) Applicant: Ford Global Technologies, LLC, Dearborn, MI (US)

(72) Inventors: Fabian Roeckner, Cologne (DE); Simon Nolden, Cologne (DE); Jens Dornhege, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 17/476,799

(22) Filed: Sep. 16, 2021

(65) Prior Publication Data
US 2022/0081024 A1   Mar. 17, 2022

(30) Foreign Application Priority Data
Sep. 17, 2020   (DE) .......................... 102020211657.1

(51) Int. Cl.
*B62D 5/04*   (2006.01)
(52) U.S. Cl.
CPC ......... *B62D 5/0463* (2013.01); *B62D 5/0403* (2013.01); *B62D 5/0481* (2013.01)
(58) Field of Classification Search
CPC .. B62D 5/0403; B62D 5/0463; B62D 5/0481; B62D 5/0484; B62D 6/008
See application file for complete search history.

(56) References Cited

U.S. PATENT DOCUMENTS

| | | | | |
|---|---|---|---|---|
| 4,992,944 A * | 2/1991 | Noto | ..................... | B62D 5/0463 701/41 |
| 6,283,243 B1 * | 9/2001 | Bohner | ..................... | B62D 5/30 180/419 |
| 6,612,395 B2 * | 9/2003 | Moser | .................. | B62D 5/0481 180/443 |
| 6,661,191 B2 * | 12/2003 | Zheng | .................. | B62D 5/0463 318/434 |
| 7,584,816 B2 * | 9/2009 | Miyajima | .............. | B62D 5/006 180/421 |

(Continued)

FOREIGN PATENT DOCUMENTS

DE   102009000868 A1   8/2010
DE   102014201107 A1   8/2014

*Primary Examiner* — Carl C Staubach
(74) *Attorney, Agent, or Firm* — Burr & Forman LLP; Lorne Forsythe (57) ABSTRACT

A steering system for a motor vehicle may include a steering wheel actuator mechanically connectable to a steering wheel of the motor vehicle, and a control unit operably coupled to the steering wheel actuator. The control unit may be configured to determine a target steering wheel torque via which the steering wheel actuator is activatable. The target steering wheel torque may be determined from a present state parameter of the motor vehicle using a steering wheel torque algorithm. The control unit may be configured to determine whether the target steering wheel torque is considered plausible or not plausible based on the present state parameter of the motor vehicle via a plausibility algorithm, determine a fallback steering wheel torque via an auxiliary algorithm, and use the fallback steering wheel torque instead of the target steering wheel torque as a target steering wheel torque request if the target steering wheel torque is not plausible.

20 Claims, 2 Drawing Sheets

(56) References Cited

U.S. PATENT DOCUMENTS

| | | | | |
|---|---|---|---|---|
| 10,787,192 B1* | 9/2020 | Katzourakis | ......... | B62D 5/0487 |
| 10,829,151 B2* | 11/2020 | Schiebahn | ............ | B60W 30/10 |
| 10,996,673 B1* | 5/2021 | Katzourakis | ........... | G05D 1/021 |
| 11,021,189 B2* | 6/2021 | Saeger | ................ | B62D 15/025 |
| 11,485,405 B2* | 11/2022 | Vizer | .................... | B62D 5/006 |
| 2003/0183441 A1* | 10/2003 | Zheng | .................. | B62D 6/008 |
| | | | | 180/402 |
| 2006/0169519 A1* | 8/2006 | Osonoi | ................. | B62D 1/163 |
| | | | | 180/402 |
| 2013/0158806 A1* | 6/2013 | Sugiyama | ............... | B62D 6/02 |
| | | | | 701/41 |
| 2014/0222295 A1* | 8/2014 | Dornhege | .............. | B62D 6/002 |
| | | | | 701/42 |
| 2015/0175197 A1* | 6/2015 | Heilig | ................... | B62D 6/008 |
| | | | | 701/42 |
| 2016/0001814 A1* | 1/2016 | Endo | ....................... | B62D 6/08 |
| | | | | 701/41 |
| 2020/0283063 A1* | 9/2020 | Kashi | ..................... | B62D 6/008 |
| 2021/0300457 A1* | 9/2021 | Kuribayashi | .......... | B62D 6/003 |
| 2021/0309292 A1* | 10/2021 | Suzuki | .................. | B62D 6/008 |
| 2021/0371008 A1* | 12/2021 | Hwang | .................. | B62D 6/008 |
| 2022/0242479 A1* | 8/2022 | Hong | ................... | B60W 10/20 |
| 2023/0063519 A1* | 3/2023 | Akatsuka | ........... | B62D 15/0205 |
| 2023/0256981 A1* | 8/2023 | Quaggiotto | ......... | B60W 50/029 |
| | | | | 701/29.2 |

* cited by examiner

STEERING SYSTEM AND METHOD FOR OPERATING A STEERING SYSTEM

TECHNICAL FIELD

Example embodiments generally relate to a steering system for a motor vehicle, and more particularly relate to controlling the steering system using a steering wheel torque algorithm.

BACKGROUND

In a motor vehicle, a steering wheel and wheels steerable thereby are generally mechanically connected to one another. To influence a travel direction of the motor vehicle, a driver can set an angle on the steerable wheels via an input of a steering wheel angle. For this purpose, the driver has to apply a corresponding torque on the steering wheel.

In conventional steering systems, assistance steering units have been introduced which provide an additional assistance torque into the steering system on the basis of the torque respectively applied by the driver on the steering wheel to increase a driving comfort. However, due to the mechanical connection between the steering wheel and the steerable wheels, the driver still receives feedback about the present driving situation and the quality of the presently traveled underlying surface, which assist the driver in fulfilling his task, to set a steering angle matching with the driving situation.

New developments show a complete mechanical separation of steering wheel and steerable wheels (steer-by-wire steering system). In this exemplary concept of the electrical coupling of steering wheel, on the one hand, and the steerable wheels, on the other hand, the steerable wheels are moved by one or more wheel actuators which follow a target specification, which is generally determined by the respective steering wheel angle, unconditionally in their physical limits.

To assist the driver in fulfilling his task of setting a correct steering wheel angle, a steering wheel torque matching with the driving situation also has to be generated artificially via a corresponding steering wheel actuator. The calculation of the steering wheel torque matching with the driving situation follows arbitrarily complex algorithms here to generate the best possible driving comfort. However, a miscalculation can have the result that the driver is suddenly disturbed in his steering angle input by a steering torque no longer matching with the driving situation.

Methods for assisting a driver are known, in which superposition steering torques requested by auxiliary functions are limited directly in amplitude and dynamic response, as described for example in DE 10 2009 000 868 A1. Moreover, methods are known which limit superposition steering torques of auxiliary functions on the basis of a steering reaction, as described for example in DE 10 2014 201 107 A1. Solutions are also known from industry in which, for steering systems in which the steering wheel is mechanically connected to steerable wheels, and assistance motor torques are limited based on a driver hand torque measurement to ensure desirable operation of a steering assistance.

BRIEF SUMMARY OF SOME EXAMPLES

In accordance with an example embodiment, a steering system for a motor vehicle may be provided. The steering system may include a steering wheel actuator mechanically connectable to a steering wheel of the motor vehicle, and a control unit operably coupled to the steering wheel actuator. The control unit may be configured to determine a target steering wheel torque via which the steering wheel actuator is activatable. The target steering wheel torque may be determined from a present state parameter of the motor vehicle using a steering wheel torque algorithm. The control unit may be configured to determine whether the target steering wheel torque is considered plausible or not plausible based on the present state parameter of the motor vehicle via a plausibility algorithm, determine a fallback steering wheel torque via an auxiliary algorithm, and use the fallback steering wheel torque instead of the target steering wheel torque as a target steering wheel torque request if the target steering wheel torque is not plausible.

In another example embodiment, a method for operating a steering system of a motor vehicle may be provided. The steering system may include a steering wheel actuator mechanically connectable to a steering wheel of the motor vehicle, and a control unit operably coupled to the steering wheel actuator. The control unit may be configured to determine a target steering wheel torque via which the steering wheel actuator is activatable. The target steering wheel torque may be determined from a present state parameter of the motor vehicle using a steering wheel torque algorithm. The method may include determining whether the target steering wheel torque is considered plausible or not plausible based on the present state parameter of the motor vehicle via a plausibility algorithm, determining a fallback steering wheel torque via an auxiliary algorithm, and using the fallback steering wheel torque instead of the target steering wheel torque as a target steering wheel torque request if the target steering wheel torque is not plausible.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

Example embodiments relate to a steering system for a motor vehicle, having at least one steering wheel actuator mechanically connectable to a steering wheel of the motor vehicle and at least one electronic control unit connected to the steering wheel actuator, which is configured to ascertain a target steering wheel torque, using which the steering wheel actuator is activatable, from at least one present state parameter of the motor vehicle using a steering wheel torque algorithm. Moreover, example embodiments relate to a method for operating a steering system of a motor vehicle, wherein a target steering wheel torque, using which a steering wheel actuator mechanically connectable to a steering wheel of the motor vehicle is activatable, is ascertained from at least one present state parameter of the motor vehicle using a steering wheel torque algorithm.

Example embodiments are based on providing a desired target steering wheel torque in every driving situation of a motor vehicle, which assists a driver of the motor vehicle in his task of lane guidance. This may be achieved, for example, by providing a steering system having the features described herein, the control unit of which is designed to check, by means of a plausibility algorithm, a plausibility of the ascertained target steering wheel torque in consideration of at least one present state parameter of the motor vehicle, to ascertain a fallback steering wheel torque by means of an auxiliary algorithm, and to use the fallback steering wheel torque as the target steering wheel torque request instead of the target steering wheel torque if the target steering wheel torque is not plausible.

In this regard, for example, the ascertained target steering wheel torque may be checked for plausibility in consideration of the present driving situation to prevent an implausible target steering wheel torque from acting on the steering wheel of the motor vehicle, which could disturb or obstruct the driver in his lane guidance task. Instead, according to the invention, if an implausible target steering wheel torque is ascertained, a switch is made to the fallback steering wheel torque and therefore this fallback steering wheel torque is used to assist the driver. Independent of any miscalculation in complex comfort functions, controllability is thus always ensured for the driver. Overall, using example embodiments, a desired target steering wheel torque is always provided to the driver in every driving situation, which assists him in his task of lane guidance. The complex comfort functions can relate both to the steering feeling itself (a simulated steering wheel torque post-processed as desired by filter, damping, or the like based on estimated or measured forces on the wheels or a vehicle model) and to assistance functions distributed over multiple modules in the vehicle, for example a lane keeping assistant or evasion assistant or the like.

According to an example embodiment, the plausibility of the target steering wheel torque is monitored by means of the control unit. For this purpose, the control unit uses the plausibility algorithm, which is executable by means of an electronics unit or software component of the control unit. The check of the plausibility of the target steering wheel torque takes place in consideration of one or more present state parameters of the motor vehicle, which are, for example, directly sensorially acquired or are ascertained by means of the control unit or another vehicle electronics unit from sensor signals. If the control unit establishes by means of the plausibility algorithm that the target steering wheel torque is implausible, it switches to the fallback steering wheel torque, which is preferably continuously calculated by a simple calculation that is desirable in every driving situation. This simpler calculation can be, for example, a function in dependence on the present steering wheel angle or can take into consideration further secure signals known in the motor vehicle. For this purpose, the control unit uses an auxiliary algorithm which is executable by means of the electronics unit or software component of the control unit, using which the plausibility algorithm is also executable, or by means of an electronics unit or software component of the control unit separate therefrom. A desired signal can be, for example, the vehicle velocity, since the driver expects a different steering behavior/steering wheel torque in dependence on the present steering wheel angle when steering at a standstill or during very slow travel than during fast travel. Preferably, each further input signal is secured with the same quality as the calculation of the fallback steering wheel torque itself. Further examples of a desired signal are, for example, a lateral acceleration, a yaw rate, a wheel steering angle, or the like.

The steering wheel actuator is connectable or connected via a steering shaft to the steering wheel of the motor vehicle. The steering wheel actuator can be designed to be electromechanical. The control unit is electrically connected to the steering wheel actuator to be able to activate the steering wheel actuator using the respective target steering wheel torque. Input signals which are supplied to the control unit and/or output signals of the control unit can be filtered or smoothed.

The steering system according to an example embodiment can be used for steering steerable running wheels of a motor vehicle which are mechanically connected to the steering wheel of the motor vehicle. Moreover, the steering system according to an example embodiment can be used for steering steerable running wheels of a motor vehicle which are not mechanically connected to the steering wheel of the motor vehicle. The motor vehicle can be a passenger vehicle or a utility vehicle.

The use of the monitoring concept according to an example embodiment may permit complex comfort functions to be implemented and verified according to the typical quality assurance standards. As long as the complex comfort functions are not secured by an external monitoring concept, they additionally have to be implemented and verified according to the highest standards typical in the industry, which is accompanied by significant additional expenditure and expense linked thereto and a longer development time until market introduction, which is avoided by example embodiments. In addition, using example embodiments, complex comfort functions can also be based on signals of sensors which possibly do not correspond to these highest standards typical in the industry or the securing of which is only linked to further significant expenditures and accompanying expenses.

According to an example embodiment, the control unit may be configured to check the plausibility of the target steering wheel torque, to compare a direction of the target steering wheel torque to a direction of a present steering wheel angular velocity, to compare the target steering wheel torque to a torque threshold value and to compare the present steering wheel angular velocity to a velocity threshold value if the direction of the target steering wheel torque corresponds to the direction of the present steering wheel angular velocity, and to use the fallback steering wheel torque instead of the target steering wheel torque as the target steering wheel torque request if the target steering wheel torque is greater than the torque threshold value and the present steering wheel angular velocity is greater than the velocity threshold value. Whether or not a target steering wheel torque calculated by comfort functions matches with the present driving situation is ascertained in this way by a comparison of the direction of the target steering wheel torque to the direction of the present steering wheel angular velocity. The steering wheel angular velocity can be measured directly here by the control unit or another electronics unit having a steering wheel angular velocity sensor or ascertained from signals of other sensors, for example by a time derivative of signals of an angle sensor. If the directions or signs of target steering wheel torque, on the one hand, and present steering wheel angular velocity, on the other hand, are different, the steering wheel angular velocity thus was not induced by the actual steering wheel torque provided by the steering wheel actuator. The target steering wheel torque can therefore be accepted as desired or assessed as plausible since the driver controls the vehicle in this situation by his input at the steering wheel and the target steering wheel torque reduces the steering wheel angular velocity. In contrast, if the directions or signs of target steering wheel torque, on the one hand, and present steering wheel angular velocity, on the other hand, are the same, the steering wheel actuator accelerates the steering wheel further in the present rotational direction by way of the actual steering wheel torque provided by it, possibly also against the present driver wish. To decide in this situation whether the target steering wheel torque matches with the present driving situation or is plausible, the present values of the target steering wheel torque and of the steering wheel angular velocity are now also evaluated. If, with identical direction or identical sign of target steering wheel torque, on the one hand, and of present steering wheel angular velocity, on the other hand, the target steering wheel torque is less than the possibly settable torque threshold value or the steering wheel angular velocity is less than the possibly settable velocity threshold value, the target steering wheel torque can thus be accepted as desired or plausible. In contrast, if both values are greater than the respectively associated threshold value, the situation is thus assessed as critical by the plausibility algorithm and it switches to the fallback steering wheel torque. To increase the robustness of the monitoring concept, the mentioned threshold values can be made dependent on further known signals describing the motor vehicle state.

A further example embodiment provides that the control unit is configured to ascertain from sensor data whether a driver of the motor vehicle presently performs a steering process on the steering wheel, and to vary the torque threshold value as a function of at least one property of the present steering process. The robustness of the monitoring of the plausibility of the target steering wheel torque can be improved in this way. The torque threshold value for the permissible level of the target steering wheel torque is increased here if the driver is actively in a steering maneuver. Whether the driver is presently active on the steering wheel can be determined by the control unit or another electronics unit, for example, from the steering torque presently applied on the steering wheel, which can be measured with the aid of a torque sensor. A substitution of the torque sensor by a chronological observation of the actual steering wheel torque provided by the steering wheel actuator and the steering wheel angle reaction resulting therefrom by means of the control unit or another electronics unit is also possible. Moreover, the use of a capacitive, thus touch-sensitive measuring steering wheel or monitoring the driver steering activity via a camera connected to the control unit or another electronics unit would also be possible for ascertaining the steering activity of the driver. The level of the torque threshold value can then be defined as a function of the present driver steering activity, for example either via interpolated tables or mathematical relationships which can be stored in the control unit or another electronics unit.

According to another example embodiment, the control unit may be configured to ascertain a toothed rack force presently acting on at least one steerable running wheel of the motor vehicle from sensor data, to compare a direction of the toothed rack force to a direction of the steering wheel angular velocity, and to increase the velocity threshold value as a function of a strength of the toothed rack force if the direction of the toothed rack force corresponds to the direction of the steering wheel angular velocity. The robustness of the monitoring of the plausibility of the target steering wheel torque can be improved in this way. The toothed rack force presently acting on at least one steerable running wheel of the motor vehicle can be directly measured via a sensor or can be calculated from other known variables, for example a wheel actuator torque presently provided by a wheel actuator acting on the steerable running wheel. The level of the velocity threshold value can then be defined as a function of the presently given toothed rack force either via interpolated tables or mathematical relationships, which can be stored in the control unit or another electronics unit.

The target steering wheel torque and the present steering wheel angular velocity can first be compared to their respective threshold values before the comparison of the direction of the target steering wheel torque to the direction of the present steering wheel angular velocity and the comparison of the direction of the toothed rack force to the direction of the steering wheel angular velocity are carried out. Only when both variables (target steering wheel torque, steering wheel angular velocity) exceed their respective threshold values are the mentioned direction comparisons subsequently carried out. Alternatively, the direction comparisons can be carried out before the comparisons of the variables to their respective threshold values.

According to another example embodiment, the control unit may be configured to increase the torque threshold value and/or the velocity threshold value if the travel velocity of the motor vehicle drops. The travel velocity of the motor vehicle is thus used in this way to increase the robustness of the monitoring of the plausibility of the target steering wheel torque. The torque threshold value and/or the velocity threshold value can be raised in the range of slow travel velocities, up to complete deactivation of the monitoring at very slow travel velocities.

Another example embodiment provides that the control unit may be configured to evaluate a ratio of the steering torque presently applied by the driver to the steering wheel to the present steering wheel angular velocity. For this purpose, the monitoring of the plausibility of the target steering wheel torque can be switched off partially or completely by the control unit if the steering torque presently applied by the driver has the same direction as the present steering wheel angular velocity. For example, a high steering wheel velocity toward the center in the case of a lower steering torque applied by the driver to the outside could still match with the driving situation and be plausible. To increase the robustness and prevent inadvertent switching to the fallback steering wheel torque, the monitoring is to be accordingly partially or completely deactivated in this case.

According to another example embodiment, the control unit may be configured to limit the target steering wheel torque to a settable maximum threshold value and to set the maximum threshold value as a function of at least one present state parameter of the motor vehicle. In this way, the robustness of the monitoring of the plausibility of the target steering wheel torque is increased further. The availability of the complex comfort function is thus further increased, since even if the maximum threshold value is exceeded briefly, the target steering wheel torque is only limited without switching directly to the simpler calculation of the fallback steering wheel torque. The maximum threshold value can also be modified based on further known motor vehicle signals. For example, in the case of large steering angles, higher target steering wheel torques toward the steering angle zero position can be permitted by increasing the maximum threshold value to represent an end stop, while in the case of smaller steering angles, the resulting maximum threshold value can be less, to ensure more desirable performance. Furthermore, the maximum threshold value could be increased with decreasing travel velocity to offer more options for the complex comfort functions and could be reduced in the case of increasing travel velocity to increase the desirability.

According to another example embodiment, the control unit may be configured to use the fallback steering wheel torque instead of the target steering wheel torque as the target steering wheel torque request only when the target steering wheel torque is not plausible over a time period of predetermined length. In this way, the robustness of the monitoring of the plausibility of the target steering wheel torque is also increased. The length of the predetermined time period can be, for example, <100 ms. In general, errors can be ignored/tolerated as a function of their duration if the effect does not result in critical behavior due to the limited duration.

A further example embodiment provides that the steering system is a steer-by-wire steering system.

In an example embodiment, a method according to which a plausibility of the ascertained target steering wheel torque is checked may be provided. The plausibility of the ascertained target steering wheel torque may be checked in consideration of at least one present state parameter of the motor vehicle by means of a plausibility algorithm, a fallback steering wheel torque is ascertained with the aid of an auxiliary algorithm, and the fallback steering wheel torque is used as the target steering wheel torque request instead of the target steering wheel torque if the target steering wheel torque is not plausible. The steering system described above may be correspondingly linked to the method. In particular, the steering system according to one of the above-mentioned example embodiments or a combination of at least two of these embodiments with one another can be used to carry out the method.

In an example embodiment, a direction of the target steering wheel torque may be compared to a direction of a present steering wheel angular velocity to check the plausibility of the target steering wheel torque, the target steering wheel torque is compared to a torque threshold value and the present steering wheel angular velocity is compared to a velocity threshold value if the direction of the target steering wheel torque corresponds to the direction of the present steering wheel angular velocity, and the fallback steering wheel torque is used as the target steering wheel torque request instead of the target steering wheel torque if the target steering wheel torque is greater than the torque threshold value and the present steering wheel angular velocity is greater than the velocity threshold value.

A further example embodiment provides that it is ascertained from sensor data whether a driver of the motor vehicle is presently performing a steering process on the steering wheel, and the torque threshold value is varied as a function of at least one property of the present steering process.

According to a further example embodiment, a toothed rack force presently acting on at least one steerable running wheel of the motor vehicle is ascertained from sensor data, a direction of the toothed rack force is compared to a direction of the steering wheel angular velocity, and the velocity threshold value is increased as a function of a strength of the toothed rack force if the direction of the toothed rack force corresponds to the direction of the steering wheel angular velocity.

According to a further example embodiment, the torque threshold value and/or the velocity threshold value is/are increased if the travel velocity of the motor vehicle drops.

A further example embodiment provides that a ratio of the present steering torque applied by the driver to the steering wheel to the present steering wheel angular velocity is evaluated.

According to a further example embodiment, the target steering wheel torque is limited to a settable maximum threshold value and the maximum threshold value is set as a function of at least one present state parameter of the motor vehicle.

According to a further example embodiment, the fallback steering wheel torque is only used instead of the target steering wheel torque as the target steering wheel torque request if the target steering wheel torque is not plausible over a time period of predetermined length.

Figure 1:
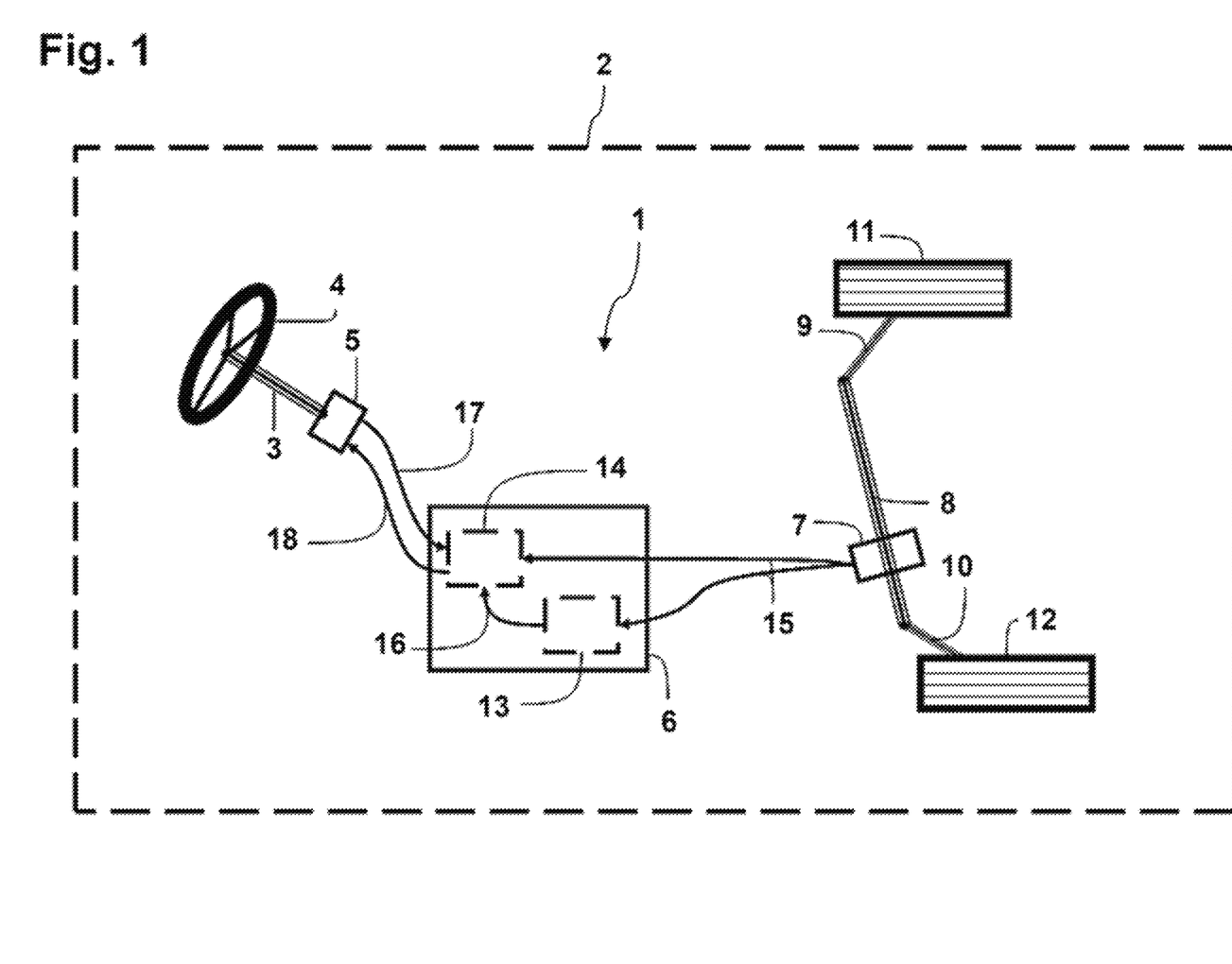
FIG. 1 is a schematic illustration of a steering system according to example embodiment.

FIG. 1 shows a schematic illustration of an exemplary embodiment of a steering system 1 according to an example embodiment for a motor vehicle 2. The steering system 1 is a steer-by-wire steering system.

The steering system 1 has a steering wheel actuator 5 mechanically connected via a steering shaft 3 to a steering wheel 4 of the motor vehicle 2 and an electronic control unit 6 connected to the steering wheel actuator 5. The steering wheel actuator 5 has a steering wheel motor (not shown) and an angle sensor (not shown).

Moreover, the steering system 1 has an axle actuator 7, which has a positioning motor (not shown) and a position sensor (not shown). The axle actuator 7 actuates a steering rod 8, which is connected in an articulated manner at the ends to tie rods 9 and 10, which are each connected in an articulated manner to a steerable running wheel 11 or 12, respectively, of the motor vehicle 2.

The control unit 6 may be configured to ascertain, from at least one present state parameter of the motor vehicle 2 using a steering wheel torque algorithm, a target steering wheel torque using which the steering wheel actuator 5 is activatable. For this purpose, the control unit 6 may have a software component 13, using which the steering wheel torque algorithm is executable.

The control unit 6 is moreover configured to check a plausibility of the ascertained target steering wheel torque in consideration of at least one present state parameter of the motor vehicle 2 by means of a plausibility algorithm, to ascertain a fallback steering wheel torque by means of an auxiliary algorithm, and to use the fallback steering wheel torque instead of the target steering wheel torque as the target steering wheel torque request if the target steering wheel torque is not plausible. For this purpose, the control unit 6 may include a software component 14, using which the plausibility algorithm and the auxiliary algorithm may be executable.

To execute the steering wheel torque algorithm, all relevant sensor signals are read and passed on as signals 15 to the control unit 6. The signals 15 either already contain present toothed rack forces or all relevant signals to be able to calculate the toothed rack forces using the control unit 6.

In addition, the control unit 6 can also input further signals. For example, the tie rods 9 and 10 can be equipped with additional sensors which measure the present toothed rack force. Alternatively, the control unit 6 or a control unit of the axle actuator 7 can estimate the toothed rack force from other provided signals.

The control unit 6 may have, inter alia, the complex comfort functions executable using the software component 13 and the monitoring function executable using the software component 14 for monitoring the plausibility of the target steering wheel torque ascertained using the software component 13. The software component 14 may calculate a target steering wheel torque 16 from the signals 15 of the axle actuator 7 and further signals of the motor vehicle 2 describing the motor vehicle state. Further driver assistance systems, for example, a lane keeping assistant, can also be implemented via the interface "target steering wheel torque", since it can be assumed that the axle actuator 7 unconditionally follows the control signal of the steering wheel actuator 5 within its physical limits in every driving situation. Due to the complexity of the functions and the dependence on external signals, the required security of the calculation can only be represented with an extremely high level of effort for every driving situation.

The software component 14 also receives the signals 15 of the axle actuator 7. Moreover, the software component 14 receives signals 17 of the steering wheel actuator 5 which contain at least the present steering wheel angular velocity. In addition, the present steering wheel angle and, for example, the measured or estimated steering wheel torque can also be transferred here via the signals 17 to the software component 14. With the aid of comparatively simple algorithms, the target steering wheel torque 16 may be monitored for its plausibility with incorporation of the signals 15 and 17. As long as a miscalculation or lack of plausibility cannot be established, the target steering wheel torque 16 calculated by the software component 13 is transferred via a signal as the target steering wheel torque request 18 to the steering wheel actuator 5. In case of a miscalculation in the software component 13 or a lack of plausibility of the target steering wheel torque, instead of the target steering wheel torque 16, a fallback steering wheel torque is used as the target steering wheel torque request 18, which may be continuously calculated using the auxiliary algorithm executable by the software component 14.

The control unit 6 may be configured, to check the plausibility of the target steering wheel torque 16, to compare a direction of the target steering wheel torque 16 to a direction of the present steering wheel angular velocity, to compare the target steering wheel torque 16 to a torque threshold value, and to compare the present steering wheel angular velocity to a velocity threshold value if the direction of the target steering wheel torque 16 corresponds to the direction of the present steering wheel angular velocity, and to use the fallback steering wheel torque instead of the target steering wheel torque 16 as the target steering wheel torque request 18 if the target steering wheel torque is greater than the torque threshold value and the present steering wheel angular velocity is greater than the velocity threshold value.

Furthermore, the control unit 6 may be configured to ascertain from sensor data whether a driver of the motor vehicle 2 presently performs a steering process on the steering wheel 4, and to vary the torque threshold value as a function of at least one property of the present steering process.

Moreover, the control unit 6 may be configured to ascertain a toothed rack force presently acting on at least one steerable running wheel 11 or 12 of the motor vehicle 2 from sensor data, to compare a direction of the toothed rack force to a direction of the steering wheel angular velocity, and to increase the velocity threshold value as a function of a strength of the toothed rack force if the direction of the toothed rack force corresponds to the direction of the steering wheel angular velocity.

In addition, the control unit 6 may be configured to increase the torque threshold value and/or the velocity threshold value if the travel velocity of the motor vehicle 2 drops.

Furthermore, the control unit 6 may be configured to evaluate a ratio of the steering torque presently applied by the driver to the steering wheel 4 to the present steering wheel angular velocity.

Moreover, the control unit 6 may be configured to limit the target steering wheel torque 16 to a settable maximum threshold value and to set the maximum threshold value as a function of at least one present state parameter of the motor vehicle 2.

Furthermore, the control unit 6 is configured to only use the fallback steering wheel torque instead of the target steering wheel torque 16 as the target steering wheel torque request 18 if the target steering wheel torque is not plausible over a time period of predetermined length.

Instead of the steering system 1 shown, the invention can also be applied to differently designed steering systems, for example to a Pitman arm system or a system having individual wheel actuators.

Figure 2:
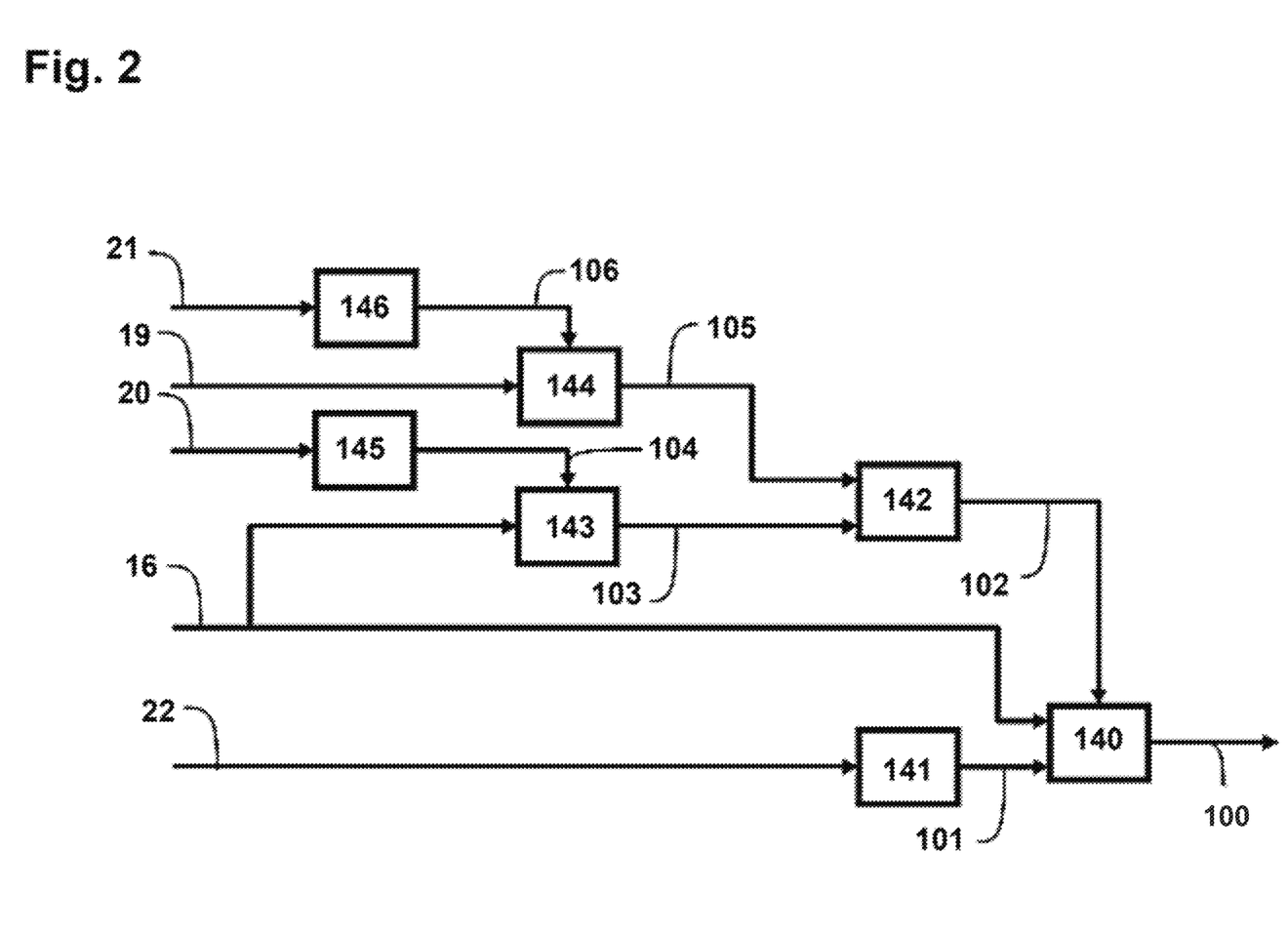
FIG. 2 is a schematic representation of a software component of a control unit of steering system according to an example embodiment.

FIG. 2 shows an exemplary embodiment of a software component 14 of a control unit of an exemplary embodiment for a steering system according to an example embodiment, wherein the steering system can be designed according to the example embodiment shown in FIG. 1.

The plausibility of the target steering wheel torque 16 is monitored using the software component 14 on the basis of a present steering wheel angular velocity 19, a present steering torque 20, and on present toothed rack forces 21. The software component 14 ensures on the basis of the evaluation by software subcomponents 140 to 146 that only a desirable target steering wheel torque 16 is supplied to the steering wheel actuator.

The software subcomponents 140 to 146 generate signals 100 to 106. It is presumed here that all participating signals follow a uniform sign convention, thus have a uniform sign in stable cornering. The target steering wheel torque 16, the fallback steering wheel torque 101, and the target steering wheel torque request 18 are expressly excluded from this rule, since they receive an opposite sign as restoring torques.

In the software subcomponent 146, two threshold values 106 min and 106 max are defined for the current steering wheel angular velocity 19 for each toothed rack force signal 21. This can be carried out, for example, by interpolation of stored table values or any other processing algorithm.

The software subcomponent 144 now applies the permitted threshold values 106 min and 106 max to the present steering wheel velocity 19 and outputs, as the output signal 105, a 0 for all values which are within the threshold values, the value 1 for all steering wheel velocities 19 greater than 106 max, and the value −1 for all steering wheel velocities 19 less than 106 min.

In the software subcomponent 145, first a driver activity signal is generated. The driver activity signal can be derived here by interpolation of stored table values, by filtering or any other processing algorithm in consideration of an input signal 20, for example of the measured steering torque, of the steering wheel actuator torque applied over time, or of a capacitive measuring steering wheel. A threshold value 104 for the target steering wheel torque 16 is now defined on the basis of this driver activity signal. This can also be carried out, for example, by interpolation of stored table values or any other processing algorithm.

The software subcomponent 143 may then apply the permitted threshold value 104 symmetrically to the target steering wheel torque 16 currently requested by the complex comfort functions and outputs as the output signal 103 a 0 for all values which in absolute value are less than or equal to the threshold value 104, a 1 for values which are positive and greater in absolute value than the threshold value 104, and a −1 for values which are negative and greater in absolute value than the threshold value 104.

The software subcomponent 142 may then compare the signals 103 and 105. If at least one of the two input signals 103 and 105 has the value 0 or both have the same value, a 0 is thus passed on as the error signal 102. For the case in which one of the input signals 103 and 105 has the value 1 and the other the value −1, the error signal 102 is thus set to 1.

The software subcomponent 141 may calculate a fallback steering wheel torque 101 desirable for every driving situation on the basis of at least the present steering wheel angle 22.

The software subcomponent 140 may decide on the basis of the error signal 102 whether the target steering wheel torque 16 or the desired fallback steering wheel torque 101 is to be requested as the target steering wheel torque request 18 by the steering wheel actuator. If the error signal 102 has the value 0, the target steering wheel torque 16 currently requested by the complex comfort functions is thus passed on to the steering wheel actuator. If it has the value 1, a switch is thus made to the desired fallback steering wheel torque 101.

The software subcomponent 140 may be configured to only switch to the desired fallback steering wheel torque 101 if the error signal 102 has the value 1 continuously or for the majority of a defined time period. Switching from the desired fallback steering wheel torque 101 to the target steering wheel torque 16 calculated by the complex comfort functions can exclusively take place when the difference of the two signals 16 and 101 falls below a settable threshold value once or for a defined time period in order to avoid jumps in the steering wheel torque which are unpleasant to the driver. Alternatively, switching from the desired fallback steering wheel torque 101 back to the target steering wheel torque 16 calculated by the complex comfort functions can be suppressed for the rest of the driving cycle.

It is understood that method steps, although described according to a certain ordered sequence, could be carried out, in part, in a sequence other than that described here. Moreover, it is understood that certain steps can be carried out simultaneously or one after the other, once or multiple times, that other steps could be added, or that certain steps described here could be omitted. In other words: The present descriptions are provided for the purpose of illustrating certain embodiments and should not be construed as a limitation of the disclosed subject matter.

The expression "and/or" utilized here, when used in a sequence of two or more elements, means that each of the listed elements can be used alone, or any combination of two or more of the listed elements can be used. If, for example, a composition is described, which contains the components A, B, and/or C, the composition can contain A alone; B alone; C alone; A and B in combination; A and C in combination; B and C in combination; or A, B, and C in combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A steering system for a motor vehicle, the steering system comprising:
    a steering wheel actuator mechanically connectable to a steering wheel of the motor vehicle; and
    a control unit operably coupled to the steering wheel actuator, the control unit being configured to determine a target steering wheel torque via which the steering wheel actuator is activatable, the target steering wheel torque being determined from a present state parameter of the motor vehicle using a steering wheel torque algorithm,
    wherein the control unit is configured to:
    determine whether the target steering wheel torque is considered plausible or not plausible based on the present state parameter of the motor vehicle via a plausibility algorithm,
    determine a fallback steering wheel torque via an auxiliary algorithm, and
    use the fallback steering wheel torque instead of the target steering wheel torque as a target steering wheel torque request if the target steering wheel torque is not plausible,
    wherein determining whether the target steering wheel torque is considered plausible or not plausible via the plausibility algorithm comprises:
      comparing a direction of the target steering wheel torque to a direction of a present steering wheel angular velocity,
      comparing the target steering wheel torque to a torque threshold value, and
      comparing the present steering wheel angular velocity to a velocity threshold value if the direction of the target steering wheel torque corresponds to the direction of the present steering wheel angular velocity.

2. The steering system of claim 1,
wherein the control unit is configured to use the fallback steering wheel torque instead of the target steering wheel torque as the target steering wheel torque request if the target steering wheel torque is greater than the torque threshold value and the present steering wheel angular velocity is greater than the velocity threshold value.

3. The steering system of claim 2, wherein the control unit is configured to determine from sensor data whether a driver of the motor vehicle presently performs a steering process on the steering wheel, and to vary the torque threshold value as a function of at least one property of the steering process.

4. The steering system of claim 3, wherein the control unit is configured to determine from the sensor data a toothed rack force acting on at least one steerable running wheel of the motor vehicle, to compare a direction of the toothed rack force to a direction of the steering wheel angular velocity, and to increase the velocity threshold value as a function of a strength of the toothed rack force if the direction of the toothed rack force corresponds to the direction of the steering wheel angular velocity.

5. The steering system of claim 4, wherein the control unit is configured to increase the torque threshold value and/or the velocity threshold value if the travel velocity of the motor vehicle drops.

6. The steering system of claim 2, wherein the control unit is configured to evaluate a ratio of a steering torque presently applied by a driver to the steering wheel to the present steering wheel angular velocity.

7. The steering system of claim 1, wherein the control unit is configured to limit the target steering wheel torque to a settable maximum threshold value and to set the maximum threshold value as a function of the present state parameter of the motor vehicle.

8. The steering system of claim 1, wherein the control unit is configured to use the fallback steering wheel torque instead of the target steering wheel torque as the target steering wheel torque request only when the target steering wheel torque is not plausible over a time period of predetermined length.

9. The steering system of claim 1, wherein the steering system is a steer-by-wire steering system.

10. A method for operating a steering system of a motor vehicle, the steering system comprising a steering wheel actuator mechanically connectable to a steering wheel of the motor vehicle, and a control unit operably coupled to the steering wheel actuator, the control unit being configured to determine a target steering wheel torque via which the steering wheel actuator is activatable, the target steering wheel torque being determined from a present state parameter of the motor vehicle using a steering wheel torque algorithm, the method comprising:
determining whether the target steering wheel torque is considered plausible or not plausible based on the present state parameter of the motor vehicle via a plausibility algorithm,
determining a fallback steering wheel torque via an auxiliary algorithm, and
using the fallback steering wheel torque instead of the target steering wheel torque as a target steering wheel torque request if the target steering wheel torque is not plausible,
wherein determining whether the target steering wheel torque is considered plausible or not plausible via the plausibility algorithm comprises:
comparing a direction of the target steering wheel torque to a direction of a present steering wheel angular velocity,
comparing the target steering wheel torque to a torque threshold value, and
comparing the present steering wheel angular velocity to a velocity threshold value if the direction of the target steering wheel torque corresponds to the direction of the present steering wheel angular velocity.

11. The method of claim 10,
wherein using the fallback steering wheel torque instead of the target steering wheel torque as the target steering wheel torque request is performed responsive to the target steering wheel torque being greater than the torque threshold value and the present steering wheel angular velocity being greater than the velocity threshold value.

12. The method of claim 11, further comprising determining from sensor data whether a driver of the motor vehicle presently performs a steering process on the steering wheel, and to vary the torque threshold value as a function of at least one property of the steering process.

13. The method of claim 12, further comprising determining from the sensor data a toothed rack force acting on at least one steerable running wheel of the motor vehicle, comparing a direction of the toothed rack force to a direction of the steering wheel angular velocity, and increasing the velocity threshold value as a function of a strength of the toothed rack force if the direction of the toothed rack force corresponds to the direction of the steering wheel angular velocity.

14. The method of claim 13, further comprising increasing the torque threshold value and/or the velocity threshold value if the travel velocity of the motor vehicle drops.

15. The method of claim 11, further comprising evaluating a ratio of a steering torque presently applied by a driver to the steering wheel to the present steering wheel angular velocity.

16. The method of claim 10, further comprising limiting the target steering wheel torque to a settable maximum threshold value and to set the maximum threshold value as a function of the present state parameter of the motor vehicle.

17. The method of claim 10, wherein using the fallback steering wheel torque instead of the target steering wheel torque as the target steering wheel torque request is only performed when the target steering wheel torque is not plausible over a time period of predetermined length.

18. The steering system of claim 1, wherein responsive to the direction of the target steering wheel torque being different from the direction of the present steering wheel angular velocity, the control unit determines that the target steering wheel torque is plausible.

19. The steering system of claim 1, wherein responsive to the target steering wheel torque being less than the torque threshold value, the control unit determines that the target steering wheel torque is plausible.

20. The steering system of claim 1, wherein responsive to the steering wheel angular velocity being less than the velocity threshold value, the control unit determines that the target steering wheel torque is plausible.

* * * * *